Sept. 14, 1926.

A. E. ATKINS

BUSHING PULLING DEVICE

Filed May 25, 1925

A. E. Atkins
INVENTOR

BY Victor J. Evans
ATTORNEY

WITNESS:

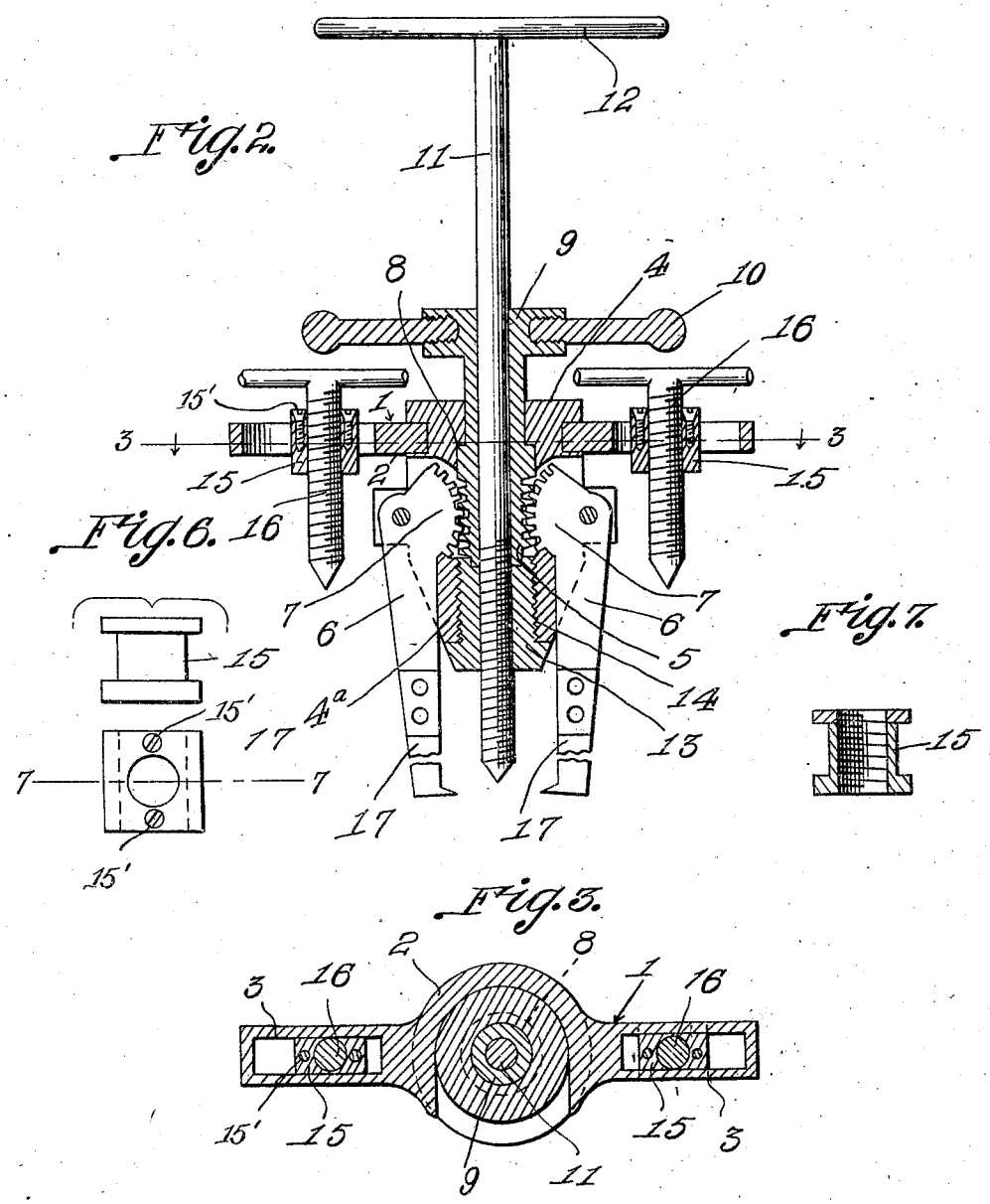

Patented Sept. 14, 1926.

1,599,738

UNITED STATES PATENT OFFICE.

ALBERT E. ATKINS, OF SAN DIEGO, CALIFORNIA.

BUSHING-PULLING DEVICE.

Application filed May 25, 1925. Serial No. 32,826.

The object of my invention is the provision of a device for pulling bushings, gears, wheels and the like and for forcing said devices; and it has for its object to provide a pulling and forcing device that is simple and strong in construction, is efficient in operation, and is susceptible of being adjusted in such manner that it is enabled to positively hold the work without crushing, breaking or scoring thereof.

Other objects and practical advantages will be fully understood from the following description and claims when the same are read in connection with the drawings accompanying and forming part of this application.

Figure 1 is a side elevation of one embodiment of my invention.

Figure 2 is a diametrical section of the same.

Figure 3 is a horizontal section on the line 3—3 of Figure 2.

Figures 4, 5, 6 and 7 are detail parts employed in the general device, Figure 7 being a section on the line 7—7 of Figure 6.

Similar numerals designate corresponding parts in all of the views of the drawings.

Figures 1, 4, 5:
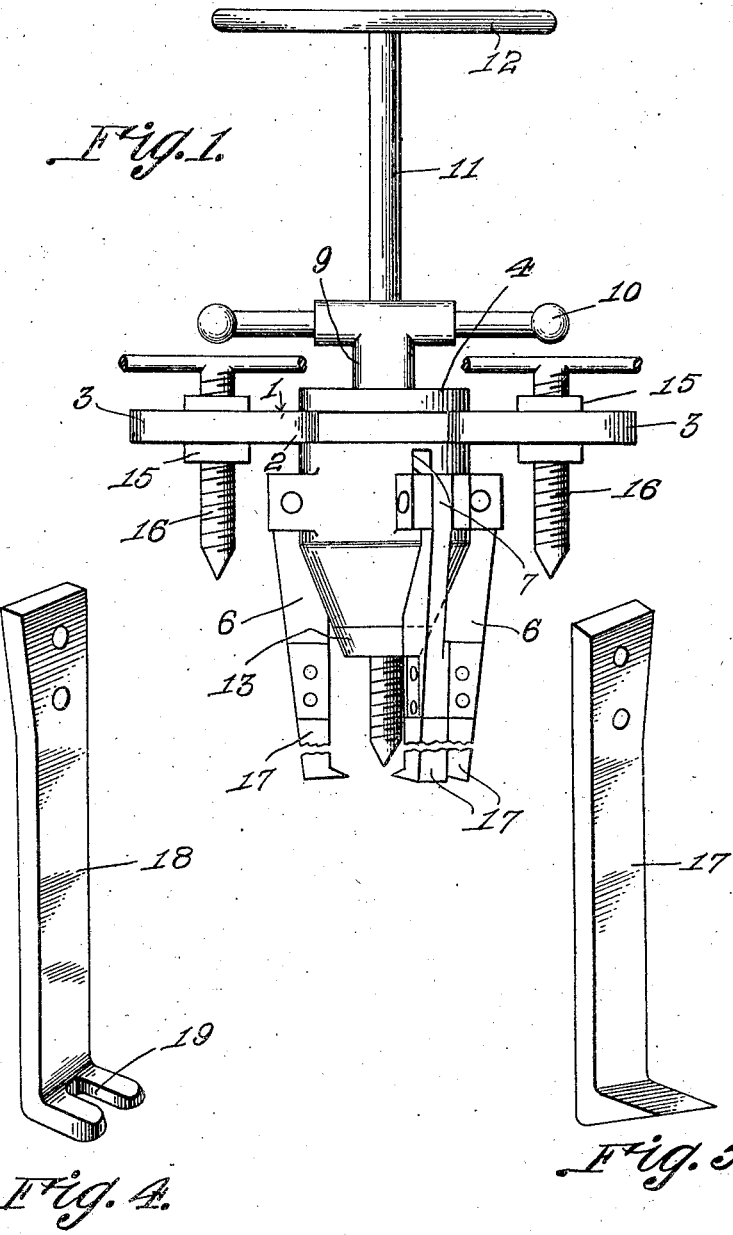

Among other elements my novel device comprises a yoke 1 having a curvilinear central portion 2, and aligned slotted arms 3. The device also comprises a frame 4, a worm screw 5 and jaws 6, each jaw having a gear sector 7 meshed with the worm screw 5 as illustrated. The worm screw 5 is arranged to be turned in the frame 4 and is provided with an abutment 8 adapted to bear outwardly against the frame 4, and appropriately fixed to a sleeve 9 integral with the worm screw 5 is a handle 10 for the powerful turning of the worm screw about its axis.

Extending through the sleeve 9 and worm screw 5 is a threaded shaft 11 equipped with a handle 12, and mounted on the threaded portion of the shaft 11 is a central pressure screw plug 13 that is also threaded at 14 in the pendant portion 4ª of the frame 4.

Arranged in the arms of the yoke 1 are screw guides 15, and threaded in said guides 15 are outside pressure screws 16. The guides 15 are flanged as illustrated in Figures 6 and 7 and the upper flange of each guide is removable and held in operative position through the instrumentality of the screw bolts 15'.

The jaws 6 are adapted to be equipped with attachments 17 and 18, one of the attachments 17 being shown in Figure 5 and one of the attachments 18 in Figure 4, and it will be understood that the said attachments are designed to be used interchangeably; also, that the attachments 17 are employed for gripping or forcing elements to be moved while the attachments 18 are provided with bifurcated arms 19 designed to straddle bolts, shafts and the like.

The screws 16 are designed to be used for leveling the device, while the handle 10 is rotated to impart a pulling action to the jaws 6 said jaws having a tendency to move inwardly by the engagement of the gear sectors with the worm screw 5 and which will afford a strong grip and practically preclude the possibility of the jaws slipping from the work. It will also be apparent that additional force can be exerted by adjusting the shaft 11 as well as by adjusting the screws 16.

The attachments 17 and 18 are connected to the jaws 6 by screws or any other appropriate means compatible with the purpose of my invention.

Manifestly, my novel device is simple and inexpensive in construction and is light in weight and is also advantageous because of the expedition with which it can be attached to and detached from work.

I have specifically described the preferred embodiment of my invention to impart an exact understanding of said embodiment. I do not desire however, to be understood as confining myself to the construction disclosed inasmuch as the scope of my invention is defined by my appended claims within which changes may be made without departing from my invention.

Having described my invention, what I claim and desire to secure by Letters Patent is:

1. A device for the purpose described comprising a frame having an interiorly threaded portion, a sleeve journalled in said frame and having an abutment to thrust against the same and also having a worm, a handle on said sleeve, a shaft extending through the sleeve and having a handle and also having a threaded portion, an interiorly and exteriorly threaded plug engaging the frame, and the said shaft and jaws pivotally mounted in the frame and having gear sectors meshed with the said worm.

2. A device for the purpose described comprising a frame having an interiorly threaded portion, a sleeve journalled in said frame and having an abutment to thrust against the same and also having a worm, a handle on said sleeve, a shaft extending through the sleeve and having a handle and also having a threaded portion, an interiorly and exteriorly threaded plug engaging the frame and the said shaft, jaws pivotally mounted in the frame and having gear sectors meshed with the said worm, in combination with a yoke receiving the said frame and having oppositely slotted arms, guides mounted in said arms and having threaded bores, and screws bearing in said bores of the guides.

3. A device for the purpose described, comprising a frame having an interiorly threaded portion, a threaded shaft provided with a handle, a sleeve also provided with a handle and receiving said shaft and mounted in the frame and provided with an abutment to thrust against the frame and also provided with a worm, jaws pivotally mounted in the frame and having gear sectors and also having attachments adapted to engage parts to be operated upon by the device, a nut mounted in the frame and engaging the thread thereof and having an interior thread engaging the thread of the shaft, a yoke engaging with the frame, and pressure screws carried by the yoke and disposed at opposite sides of the frame.

In testimony whereof I affix my signature.

ALBERT E. ATKINS.